May 19, 1953     C. D. NITCHIE     2,638,962
MACHINE FOR MAKING CORRUGATED PAPER
Filed Feb. 24, 1951
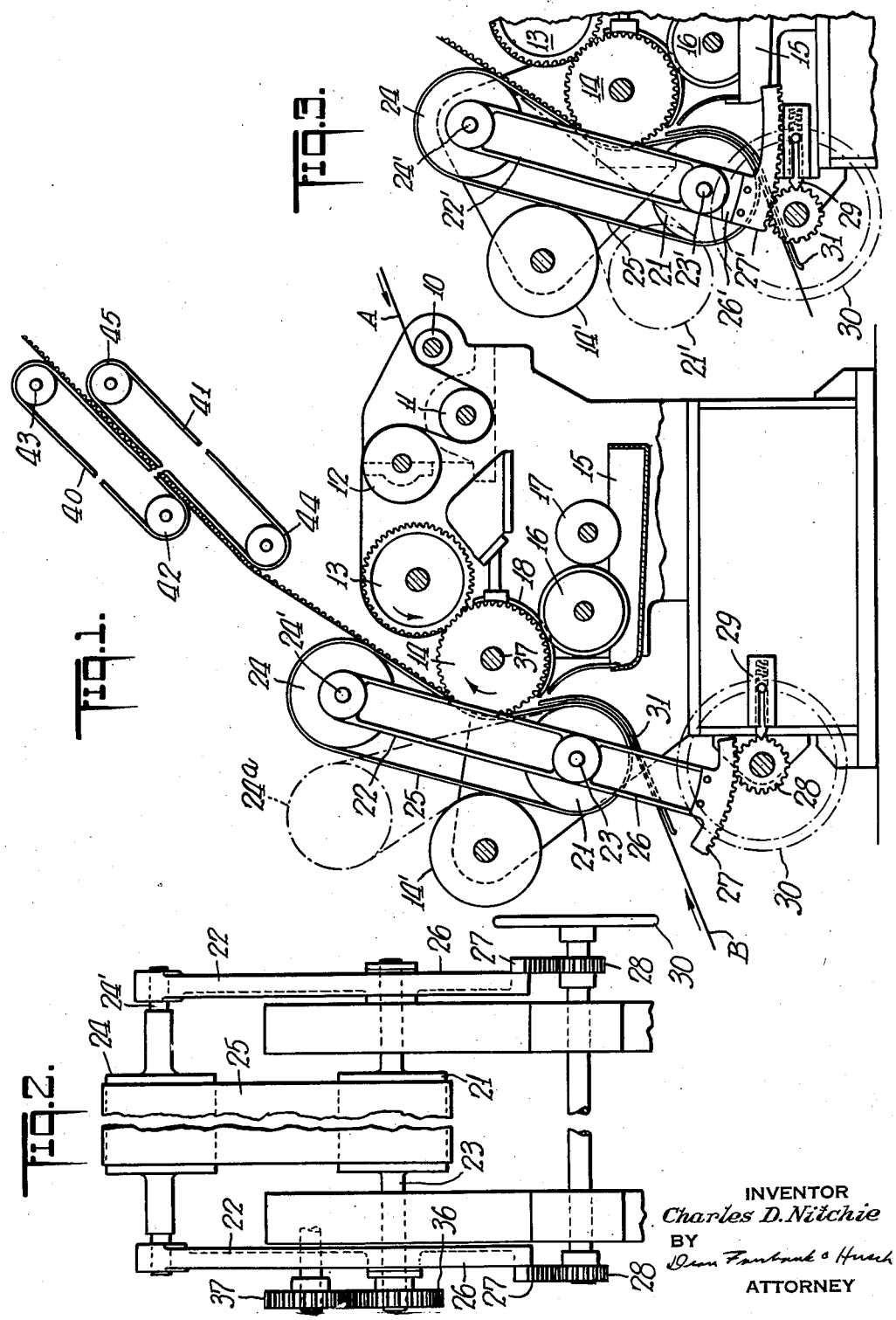
INVENTOR
*Charles D. Nitchie*
BY
ATTORNEY Patented May 19, 1953

2,638,962

UNITED STATES PATENT OFFICE 2,638,962

MACHINE FOR MAKING CORRUGATED PAPER

Charles D. Nitchie, Haddonfield, N. J., assignor to Samuel M. Langston Co., Camden, N. J., a corporation of New Jersey Application February 24, 1951, Serial No. 212,659

9 Claims. (Cl. 154—31)

In the manufacture of single faced corrugated paper it has been the standard practice for many years to pass one of the sheets between a pair of intermeshing fluted rolls to corrugate it; to apply transverse stripes of adhesive to one of the sheets, and to then press the corrugated sheet and a facing sheet together. Although the adhesive is usually applied to the crowns of the corrugations while the sheet is on the surface of one corrugating roll, as shown in Sieg Patent 1,835,816, it may be applied in stripes to the facing sheet, as shown in Goettsch 2,531,036. The facing sheet and the corrugated sheet are then pressed together between a smooth faced roll and one of the corrugating rolls. As the pressure is applied only along the line of tangency of the two rolls, and the sheets are traveling at a rapid rate, it often occurs that the adhesive does not become set sufficiently while under pressure, and the two sheets may spring apart at one or more of the corrugations after the pressure is relieved. Thus an unsatisfactory product is produced, particularly when the machine is operated at high speed to produce a maximum product per hour.

It has been proposed to press the two sheets together for a longer period of time by means of a belt following along at least one-half of the periphery of one of the corrugating rolls, as shown in the Ferres Patent 545,354 and McPike et al. Patent 972,121. In such constructions it is difficult to thread up the machine for starting operation, and so far as I am advised, such machines have not been found to be practical, and are not now in use.

The main object of my invention is to provide a mechanism whereby the pressing belt may be readily moved to inoperative position to facilitate threading up of the machine, and then moved to operative position where it is applied to the sheets along an arc of the desired length.

A further object is to provide means whereby the pressure belt is kept under uniform tension regardless of the length of the arc in which it is deflected from a straight line of travel while acting on the assembled sheets.

As an important feature of my invention, at least one of the belt carrying rollers may be moved to such a position that the belt is free of the paper, or merely tangent to one of the rolls, to permit threading up of the machine. As it may be held in different positions, it is possible to vary the length of the arc along which the belt operates on the assembled sheets. As a further feature, means are provided whereby the tension on the belt is kept constant in all positions of adjustment.

In carrying out my invention I provide an endless belt which may be substantially as wide as the paper being operated upon, and press one run of the belt onto the facing sheet along a desired portion of the periphery of one of the corrugating rolls on which the sheets are brought together. The belt is mounted on a pair of rollers, one of which may be bodily moved to bring the belt to inoperative position to facilitate threading up of the machine, and may be held in different positions to vary the arc along which it applies pressure to the assembled sheets.

As a further feature I provide an idler roll spaced from the corrugating roll to a distance less than the diameter of the belt supporting rolls. Thus, slack produced by moving the belt away from the corrugating roll is taken up and the tension on the belt is kept constant, regardless of the length of the arc along which it acts on the sheets.

A machine embodying my invention is shown in the accompanying drawing, in which:

Fig. 1 is a vertical longitudinal section through a machine embodying my invention.

Fig. 2 is an end view of the belt tensioner, intermediate parts of transverse members being broken away, and Fig. 3 is a section similar to a portion of Fig. 1, and showing and alternative mounting of the belt.

In the machine illustrated a sheet of paper A is delivered over idler rolls 10, 11 and 12, and thence over a corrugating roll 13 and between it and a second corrugating roll 14. Glue or other adhesive in a pan or other vessel 15 is picked up by a roll 16, the excess is wiped off by a roll 17, and the glue is applied to the corrugated sheet A as it passes along the underside of the corrugating roll 14. The corrugated sheet is kept in contact with the roll 14 by curved fingers 18 which may lie in grooves on the periphery of the glue transfer roll 16. The facing sheet B is directed into contact with and pressed against the adhesive bearing surface of the corrugated sheet A while the latter is on roll 14. To the extent above described, the machine may be of any well known and conventional type.

In carrying out my invention as shown in Figs. 1 and 2, I provide a pair of belt pulleys 21 and 24 journaled in a frame formed primarily of a pair of arms 22 which may be journaled on the shaft 23 of the pulley 21. These pulleys are spaced at some distance apart, and carry a belt 25 which is preferably of a width as great as that of the sheets A and B, which are operated upon. The pulleys are so positioned that by swinging the arms 22 the belt may be moved in one direction and away from the roll 14 to facilitate threading, and by swinging the arms in the opposite direction the belt may be caused to engage with the outer surface of the facing sheet B along a substantial portion of the periphery of the corrugating roll 14, and hold the facing sheet against the corrugated sheet.

Opposite to the corrugating roll 14 there is mounted an idler 14', preferably of the same diameter, the spacing of the two rolls being less than the diameter of the pulleys 21 and 24. Thus, in threading up the machine the roll 24 may be moved to the position indicated by 24a as the arms are swung on shaft 23 as a center. As the arms 22 are moved to different positions, the slack resulting from moving the belt away from the roll 14 is taken up by the roll 14', and the tension on the belts is kept constant, regardless of the adjusted position of the arms 22 and the belt. The facing sheet and the corrugated sheet are held together during all of the periods while the belt is pressing the two sheets against the corrugating roll 14, and the glue has an adequate time in which to set.

For swinging the arms and holding them in adjusted position, one or both of the arms may have an extension 26 at its lower end, and below the shaft 23, and the extension has a curved gear section 27 meshing with a pinion 28 which may be rotated by a hand wheel 30. A spring pressed pin 29 may engage the teeth of the pinion to normally hold it against rotation. Thus the arms may be swung in either direction, and to the position desired, by means of the hand wheel. The pin 29, being spring pressed, will permit such forced adjustment, but normally will hold the pinion against free rotation and thus hold the belt and its carrying parts in the desired position in respect to the corrugating roll 14, with the two sheets pressed together along the desired arc to permit setting of the adhesive.

To thread up the machine the hand wheel 30 is rotated to move the roll 24 to the dotted line position 24a, and with the belt 25 away from the corrugating roll 14, and the facing sheet B is fed in over a guide plate 31. After starting, the arms 22 are adjusted to the desired position to cause the facing sheet and the corrugated sheet to be held together for the desired distance along the periphery of the corrugating roll 14. Thus the glue or other adhesive has time to set, and a more satisfactory product is made than can be made on an old type machine where the pressing element holds the sheets together only while they make line contact.

To pull the assembled pair of sheets from the machine there may be provided a pair of belts 40 and 41 mounted on pairs of rolls 42, 43 and 44, 45, so positioned that the two parallel runs are spaced apart to a distance substantially equal to the thickness of the product. They may also act to further hold the two sheets together during the final setting of the adhesive and give further time for the adhesive to set with the corrugated sheet and the facing sheet held together. One roll of each pair may be driven, although in some instances the belts are moved by frictional engagement with the paper drawn between them.

In the construction shown in Figs. 1 and 2, the arms swing on the axis of the lower roll 21, but it will be obvious that instead they may be pivoted at their upper ends. In Fig. 3 I have shown the shaft 24' of upper pulley 24 journaled in the frame, and shaft 33' of the lower pulley 21 journaled in the arms 22'. I have also shown gear section 27' somewhat longer, and carried by a shorter arm 26'. In both forms one pulley of the shaft may be driven to give the belt the same speed as the sheet. In Fig. 2 I have shown the shaft 23 driven by gears 36, 37, the shaft of the gear 37 being that of the corrugating roll 14. Similar driving means may be provided for driving the shaft 24' of Fig. 3 from the shaft of the corrugating roll 13.

From the drawing and the foregoing description it will be seen that the belt holds the sheets together for an appreciable time, that the belt may be moved away to facilitate threading up, and that the tension on the belt is kept constant due to the fact that the spacing of corrugating roll 14 and the idler 14' is less than the diameter of the pulleys 21 and 24.

Having thus described my invention what I claim as new and desire to secure by Letters Patent is:

1. A machine for making single faced corrugated paper, including a pair of intermeshing corrugating rolls for corrugating one sheet, a movable frame member having a pair of spaced rolls, a belt carried by said last mentioned rolls, means for adjusting the position of said frame member whereby said belt presses a facing sheet onto the corrugated sheet along any selected arc of the periphery of one of said corrugating rolls, and means for maintaining the tension of the belt constant regardless of the length of said arc.

2. A machine for making single faced corrugated paper, of the type having a pair of intermeshing corrugating rolls for corrugating one sheet, means for applying adhesive to the crowns of the corrugations while engaging one of said rolls, a belt for pressing a facing sheet onto the adhesive coated crowns of the corrugated sheet, a pair of rolls for supporting said belt, and means for moving one of said rolls to vary the distance along which the sheets are pressed together, and means for holding said belt under uniform tension in its different adjusted positions.

3. A machine for making single faced corrugated paper, including a pair of intermeshing corrugating rolls for corrugating one sheet, a pivoted frame having a pair of idler rolls, one at the pivotal center of said frame, a belt carried by said idler rolls, means for swinging said frame member to cause said belt to press a facing sheet onto the corrugated sheet along a variable portion of the periphery of one of said corrugating rolls, and an idler roll spaced from said last mentioned corrugating roll to a distance less than the diameter of said idler rolls, whereby the tension on said belt is kept substantially constant in its various adjusted positions.

4. A machine for making single faced corrugated paper, including a pair of fluted rolls for corrugating a sheet, means for applying adhesive to the crowns of the corrugations in said sheet while the latter is in engagement with one of said fluted rolls, a pivoted frame having a pair of idler pulleys one being at the pivotal center of said frame, an endless belt supported by said pulleys, a third idler roll of substantially the same diameter as said last mentioned fluted roll and spaced therefrom to a distance less than the diameter of said idler rolls, whereby said belt is kept under substantially constant tension in different adjusted positions, and means for adjusting the position of said frame to press a facing sheet against the corrugated sheet along a desired portion of the periphery of one of said fluted rolls.

5. A machine for making single faced corrugated paper, including a pair of fluted rolls for corrugating a sheet, means for applying adhesive to the crowns of the corrugations in said sheet while the latter is in engagement with one of said fluted rolls, a pivoted frame having a pair of idler pulleys, one being at the pivotal center of said frame, an endless belt supported by said pulleys, said frame having a curved gear section concentric with its pivotal center, and means engaging said gear section to resist but permit swinging of said frame.

6. A machine for making single faced corrugated paper, including a pair of fluted rolls for corrugating a sheet, means for applying adhesive to the crowns of the corrugations in said sheet while the latter is in engagement with one of said fluted rolls, a pivoted frame having a pair of idler pulleys, one being at the pivotal center of said frame, an endless belt supported by said pulleys, said frame having a curved gear section concentric with its pivotal center, and a spring pressed pin engaging said gear section to resist but permit swinging of said frame.

7. A machine for making single faced corrugated paper, including a pair of fluted rolls for corrugating a sheet, means for applying adhesive to the crowns of the corrugations in said sheet while the latter is in engagement with one of said fluted rolls, a pivoted frame having a pair of idler pulleys, one being at the pivotal center of said frame, an endless belt supported by said pulleys, said frame having a curved gear section concentric with its pivotal center, a pinion engaging said gear section, and means for rotating said pinion to swing said frame.

8. A machine for making single faced corrugated paper, including a pair of fluted rolls for corrugating a sheet, means for applying adhesive to the crowns of the corrugations in said sheet while the latter is in engagement with one of said fluted rolls, a movable frame having a pair of idler pulleys, an endless belt supported by said pulleys, said frame having a curved gear section concentric with its pivotal center, and a spring pressed pin engaging said gear section to resist but permit swinging of said arm.

9. A machine for making single faced corrugated paper, including a roll for corrugating a sheet following a portion of the periphery of said roll, a pair of pulleys, a belt supported by said pulleys for pressing a facing sheet against said corrugated sheet along a predetermined arc of said corrugating roll, means for adjusting the position of one of said pulleys to vary the length of said arc, and means for maintaining the tension on said belt uniform in its different adjusted positions.

CHARLES D. NITCHIE.

References Cited in the file of this patent

UNITED STATES PATENTS

| Number | Name | Date |
|---|---|---|
| 545,354 | Ferres | Aug. 27, 1895 |
| 972,121 | McPike et al. | Oct. 4, 1910 |
| 1,179,941 | Langston | Apr. 18, 1916 |
| 1,180,828 | Crane | Apr. 25, 1916 |
| 1,327,158 | Hawkins | Jan. 6, 1920 |
| 1,855,503 | White | Apr. 26, 1932 |

FOREIGN PATENTS

| Number | Country | Date |
|---|---|---|
| 380,189 | Great Britain | Sept. 15, 1932 |